United States Patent [19]

Hurst

[11] Patent Number: 5,700,505
[45] Date of Patent: Dec. 23, 1997

[54] METHOD OF IMPROVING HEAD RICE YIELD

[75] Inventor: William D. Hurst, Orlando, Fla.

[73] Assignee: MEI Research, Inc., Orlando, Fla.

[21] Appl. No.: 580,471

[22] Filed: Dec. 28, 1995

[51] Int. Cl.[6] ............................................. A23L 1/182
[52] U.S. Cl. .................. 426/312; 426/316; 426/320; 426/419; 426/483
[58] Field of Search ............................ 426/312, 320, 426/316, 418, 419, 483, 482, 627, 236, 462, 472

[56] References Cited

U.S. PATENT DOCUMENTS

| | | | |
|---|---|---|---|
| 57,838 | 9/1866 | Adams . | |
| 277,768 | 5/1883 | Mitchell | 426/312 |
| 1,215,254 | 2/1917 | Darden | 426/312 |
| 1,267,204 | 5/1918 | Frick . | |
| 2,339,507 | 1/1944 | Nagy et al. | 426/312 |
| 2,379,677 | 7/1945 | Borsakovsky | 426/320 |
| 2,867,256 | 1/1959 | Earle | 426/483 |
| 3,089,527 | 5/1963 | Wasserman et al. | 426/483 |
| 3,261,690 | 7/1966 | Wayne . | |
| 4,376,130 | 3/1983 | Astrack | 426/312 |
| 4,549,477 | 10/1985 | McCabe | 426/312 |
| 5,352,467 | 10/1994 | Mitchell et al. | 426/312 |

FOREIGN PATENT DOCUMENTS

| | | | |
|---|---|---|---|
| 2069149 | 3/1990 | Japan . | |
| 21971 | 10/1898 | United Kingdom | 426/312 |

OTHER PUBLICATIONS

The Ozonolysis of Philippine Unsaturated Oils, V.P. Arida, F.C. Porlaza and W.J. Schmitt, excerpted from *The Philippine Journal of Science*, pp. 249–252, 1967.

Installation Instructions for the Hydrozone™ 800, Marschand Enterprizes, Inc., *Owner's Manual for the Hydro–800*. Mar. 1995.

Ozone Monitor Installation—Model HC–12, PCI Ozone & Control Systems, Inc., *Ozone Monitor Operating and Instruction Manual—Model HC–NEMA 12*. no date given.

*Primary Examiner*—Steven Weinstein
*Attorney, Agent, or Firm*—Allen, Dyer, Doppelt, Milbrath & Gilchrist, P.A.

[57] ABSTRACT

Dehulled brown unmilled rice is exposed to ozone gas in an ozone and air gas mixture. The exposed brown rice is stored for at least a day to sufficiently affect the bran before subjecting the exposed rice to a typical milling process. The milling of the exposed brown rice results in reduced breakage and thus increased head rice yield to economically attractive levels.

30 Claims, 3 Drawing Sheets

5,700,505

1

METHOD OF IMPROVING HEAD RICE YIELD

BACKGROUND OF INVENTION

1. Field of Invention

The invention relates generally to methods of processing grains for improving yield from milling, and more particularly to an ozone pre-milling treatment of brown rice for reducing breakage and thus enhancing the head rice yield.

2. Background Art

Rice is one of the world's most important food crops with billions of pounds of rough rice produced in the United States alone each year. A grain of rice has a rough outer hull or shell that is not good to eat. The kernel within this fairly loose covering is surrounded by a series of brownish skins or layers referred to as the bran coat or coats. This coat contains most of the vitamins and minerals. The bran coat sticks closely to the kernel. Humans typically eat the hard starchy kernels. Farmers throughout the world cultivate thousands of varieties of rice. The dried, threshed grain, still enclosed in its hull, is called rough rice. Typically the farmers sell the rough rice to shellers or millers, who remove the hulls and bran with successive milling operations to produce the polished rice which we eat. Brown rice results from the dehulling of the rough rice kernel. Head rice results from the milling of the brown rice. Since milled whole kernels, commonly known as head rice, are worth much more than broken kernels, the reduction in breakage in milling is of great economic importance. It has been shown that a one percent increase in head rice yield provides a significant increase in production value and thus potentially millions of dollars per percentage increase in extra earnings for the United States alone.

The main concern in rice milling is, in fact, head rice yield. However, another important and related aspect of milling quality lies in the degree of milling, which is a measure of the amount of bran remaining on the milled kernels. Current milling includes the mechanical removal of the bran layers by either a kernel to kernel friction process or by abrasion of kernels against a stone surface. Various processes and studies have been employed to improve head rice yield using the well known milling standards.

By way of example, U.S. Pat. No. 3,089,527 to Wasserman et al. discloses a process for increasing milling yields of rice to obtain increased amounts of head rice yield and total rice from a given weight of rough rice. The rice is exposed to heated air for an interval, then stored to permit equilibration of moisture content, then again subjected to drying, again stored, and so on to bring the rice to a desired moisture content with minimum damage to the rice. U.S. Pat. No. 3,261,690 to Wayne discloses the extractive milling of brown rice in the presence of an organic solvent. The process comprises milling bran from brown rice in the presence of a solvent effective to extract fatty components from the rice and germ. Further, investigation of alternative milling techniques aimed at reducing or totally eliminating the amount of physical milling required to reach a specified degree of milling are currently ongoing at the University of Arkansas under the direction of T. J. Siebenmorgan.

It is also known to use ozone in the treatment of foods and food products. U.S. Pat. No. 1,267,204 to Frick discloses a method of deodorizing grains including exposing the grain to be treated to the action of ozone and steam which removes disagreeable odors so that the grain is fit to be eaten by animals. U.S. Pat. No. 2,379,677 discloses a method of milling grain wherein ozone is used as a sterilizing treatment after the loose bran has been separated. As described in U.S. Pat. No. 4,376,130 to Astrack et al. the ozonolysis of whole seeds is performed for the bleaching of seed pods to an off-white color. The treatment is economical and leaves no adverse effect upon taste or aroma of the seeds treated.

While the focus of the present invention is to improving head rice yield from the milling of brown rice, the stripping of epidermal material from certain grains in general is anticipated. As described in U.S. Pat. No. 2,867,256 to Earle, the principal cereal grains used for human food such as wheat, rye, brown rice and oats are characterized by laminate bran coats in close enveloping relation with the kernel or starchy endosperm of each individual grain. By way of example, the bran coat of the various grain varieties will differ as to number, individual character, and particular interrelation of their constituent laminations. The bran coat of wheat characteristically consists of six separate recognizable laminations where the outermost is devoid of food value and expediently separable from the underlying laminations. The inner bran coat layers carry nutritional properties and are not adapted to be readily parted from one another. In the case of brown rice, the multi-layer bran coat reacts progressively and rather uniformly to the appropriate techniques of complete detachment from the associated endosperm to condition the latter for use in a conditional form. The Earle '256 patent discloses a method of stripping the epidermal material from grains with moisture conditioning and time tempering of the material for a subsequent epidermal reaction to the pressures and frictions of grain migration. As the moisture penetrates the epidermis, the film of binding material thereunder becomes soft and loosens its adhesive qualities to an extent that permits a separation of the epidermis from the epicarp through moderate friction of the grain berries one against the other, or between surfaces moving at varying speeds and controlled pressures, such as in the conventional rice cones, under pressure much less than will fracture the berries. The present invention seeks to provide a simple and economical pretreatment for use prior to conventional milling methods.

SUMMARY OF INVENTION

It is an object of the present invention to provide a pretreatment of grains which increases milling yields. It is a primary object of the present invention to improve head rice yield from the milling of brown rice. A further object of the invention is to provide an efficient method for exposing dehulled or brown rice to ozone in preparation of the brown rice for milling. It is yet another object of the invention to pretreat rice prior to milling such that rice bran layers are sufficiently affected for making the brown rice easier to mill thus reducing breakage and increasing head rice yield. It is yet another object of the invention to expose the brown rice to minimal yet sufficient ozone doses for significantly improving the rice yield after limited storage of the exposed brown rice. It is further an object of the invention to expose the brown rice in an economic pre-milling process for improving head rice yield without altering milling processes well known in the art.

In the present invention, a method for milling rice comprises exposing brown rice to ozone, storing the exposed rice for delaying the time between exposure and milling, and milling bran from kernels of the brown rice with sufficient pressure to remove a desired amount of bran layers. The ozone is generated and supplied in an ozone and air mixture. The exposure is monitored for limiting rice exposure to permit a substantial portion of brown rice to react with the ozone. Relatively small quantities of ozone gas are used to expose the brown rice yet sufficient to affect the rice prior to milling for permitting an interaction between the ozone and the brown rice and thus improve milling properties. Less breakage is observed and thus increased head rice yield after milling, the primary object of the present invention.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

Figure 1:
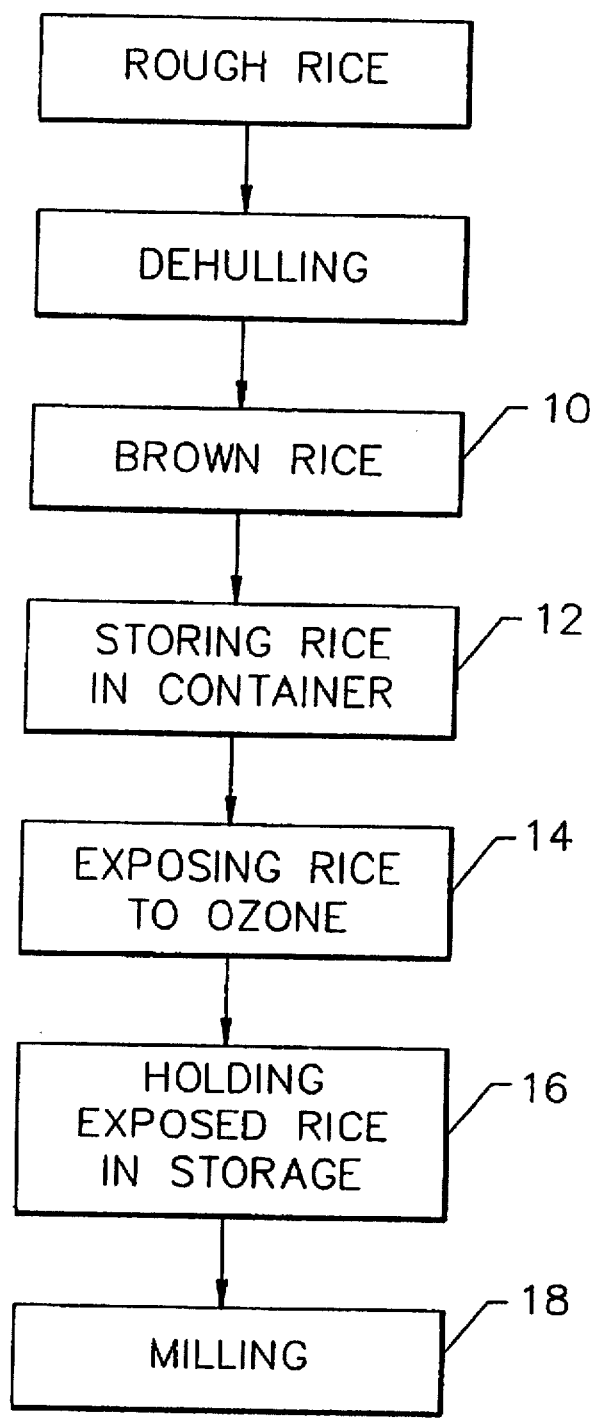
FIG. 1 is a functional flow diagram illustrating the ozone exposure of brown rice prior to the milling.

The preferred embodiment of the invention, a method for pretreatment of brown rice for improved head rice yield is illustrated with reference to FIG. 1. As shown, brown rice 10 is provided after dehulling of brown rice and placed within a storage container 12 in preparation for exposing the rice to ozone. The brown rice is exposed to a limited amount of the ozone 14 and held in a sealed storage facility 16 in order to permit the ozone to affect the brown rice for permitting the bran to be more readily removed during the milling. After storage for at least one day, the brown rice is milled 18 with the result being an increased head rice yield when compared to untreated rice. Results of tests performed revealed that milling the rice immediately after exposure to the ozone has no measurable and in some cases a detrimental effect on yield. Further, heavy exposure to ozone does not enhance yield. In fact, initial tests showed that light gas exposure and storage time to permit the ozone to react with the brown rice prior to milling results in a significant reduction in broken kernels to a level for significantly increasing head rice yield.

Figure 2:
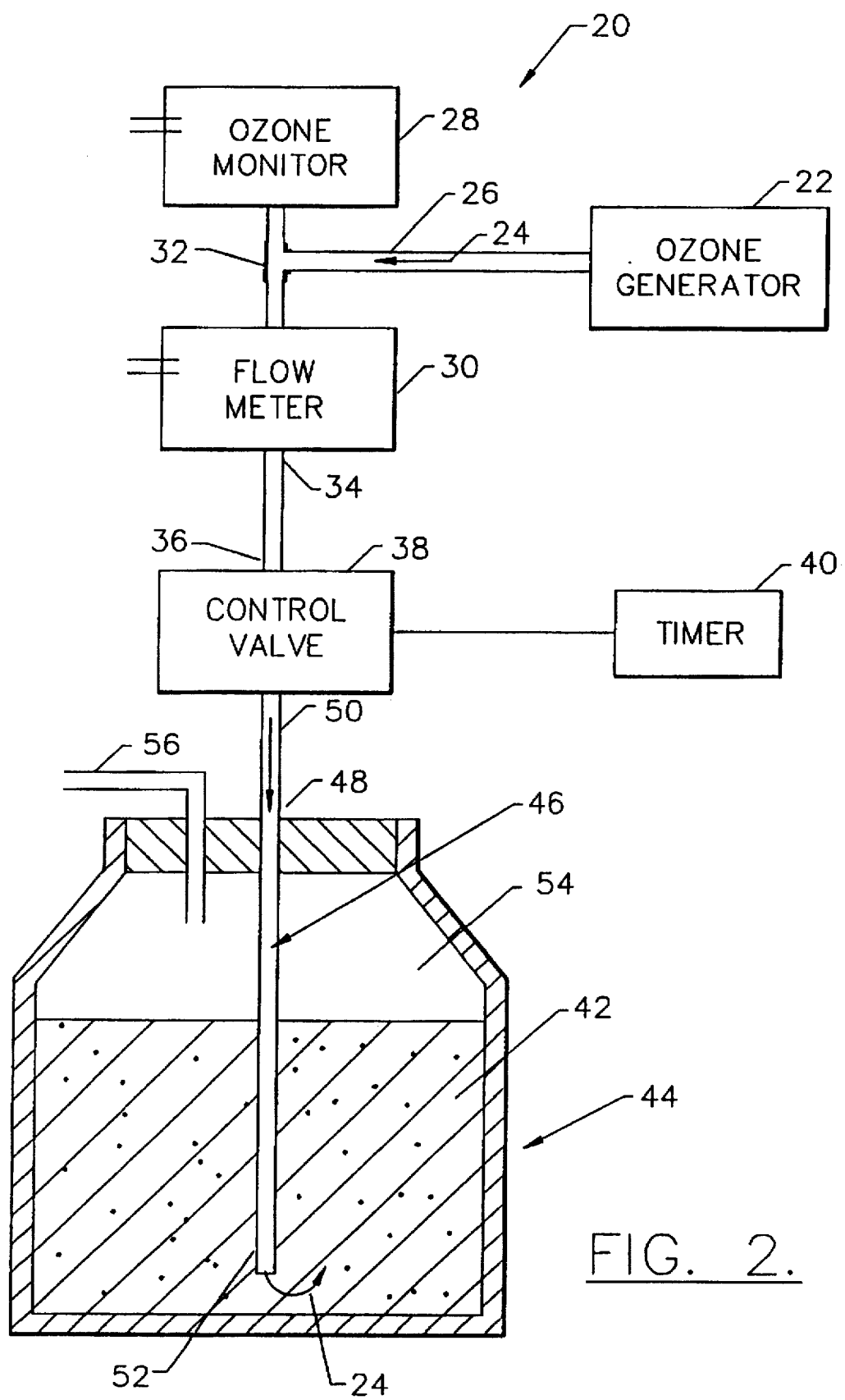
FIG. 2 is a partial schematic diagram illustrating apparatus used in performing the brown rice exposure.

The pretreatment of the brown rice was conducted using the apparatus 20 as illustrated with reference to FIG. 2. A pressurized ozone generator 22 by Hydrozone (™), Model 800, manufactured and distributed by Marschand Enterprises, Inc., Orlando, Fla. is used to provide an air and ozone gas mixture 24. The gas mixture 24 is delivered through a conduit 26 to an ozone monitor 28 and through a flow meter 30 by diverting the mixture 24 through a T-connector 32. One output 34 of the flow meter 30 provides an input 36 to a solenoid valve 38. The valve 38 closure is controlled by a timer 40 and remains in the closed position until exposure of brown rice 42 is needed. The brown rice 42 is held within a container 44. The container 44 comprises an inlet tube 46 having an input end 48 communicating with a valve output 50. A tube output end 52 is positioned within the rice 42 at a bottom portion of the container 44. A container top portion 54, above the rice 42 has a vent 56 permitting the gas mixture 24 entering the container 44 to flow through and expose a substantial portion of the rice 42.

In operation, the generator 22 is placed in continuous operation while controlling the flow of gas 24 to the flow meter 30 such that a known amount of gas mixture 24 and thus ozone is injected into the rice 42 through the tube 46 by opening the valve 38 for a preset time period. The flow meter 30 used comprised a series of Dwyer (R) Flowmeters having sight flow indicators. The ozone monitor 28 was Model HC-NEMA 12 Ozone Monitor by PCI Ozone & Control Systems, Inc.

In the tests performed, 350 grams of brown rice 42 was consistently used. Approximately 1000 ppm of ozone in the gas mixture 24 was injected into the container 44 for a period of approximately 16 seconds as controlled by the timer 40 preset for this period. The rice 42 was at ambient room temperature of approximately 80 degrees Fahrenheit and maintained after exposure at approximately 36 degrees Fahrenheit during storage. Twenty five sample runs were made including exposed and unexposed rice in preparation for milling. The milling was performed from one day to twenty two days after exposure with the results showing a significant reduction in kernel breakage during milling from typically ten to thirty percent when compared to the unexposed samples. Milling within a time window of from three days to five days showed significant improvement. Further, the milling of each sample was performed at a consistent degree of milling. In all cases, the storage of the exposed rice showed reduced breakage and thus increased head rice yield when compared to unexposed brown rice and immediate milling of exposed rice.

Results further showed cycles of optimum milling windows. Tests continue on rice exposure and delay in milling for providing optimum and consistent head rice yield increases.

Figure 3:
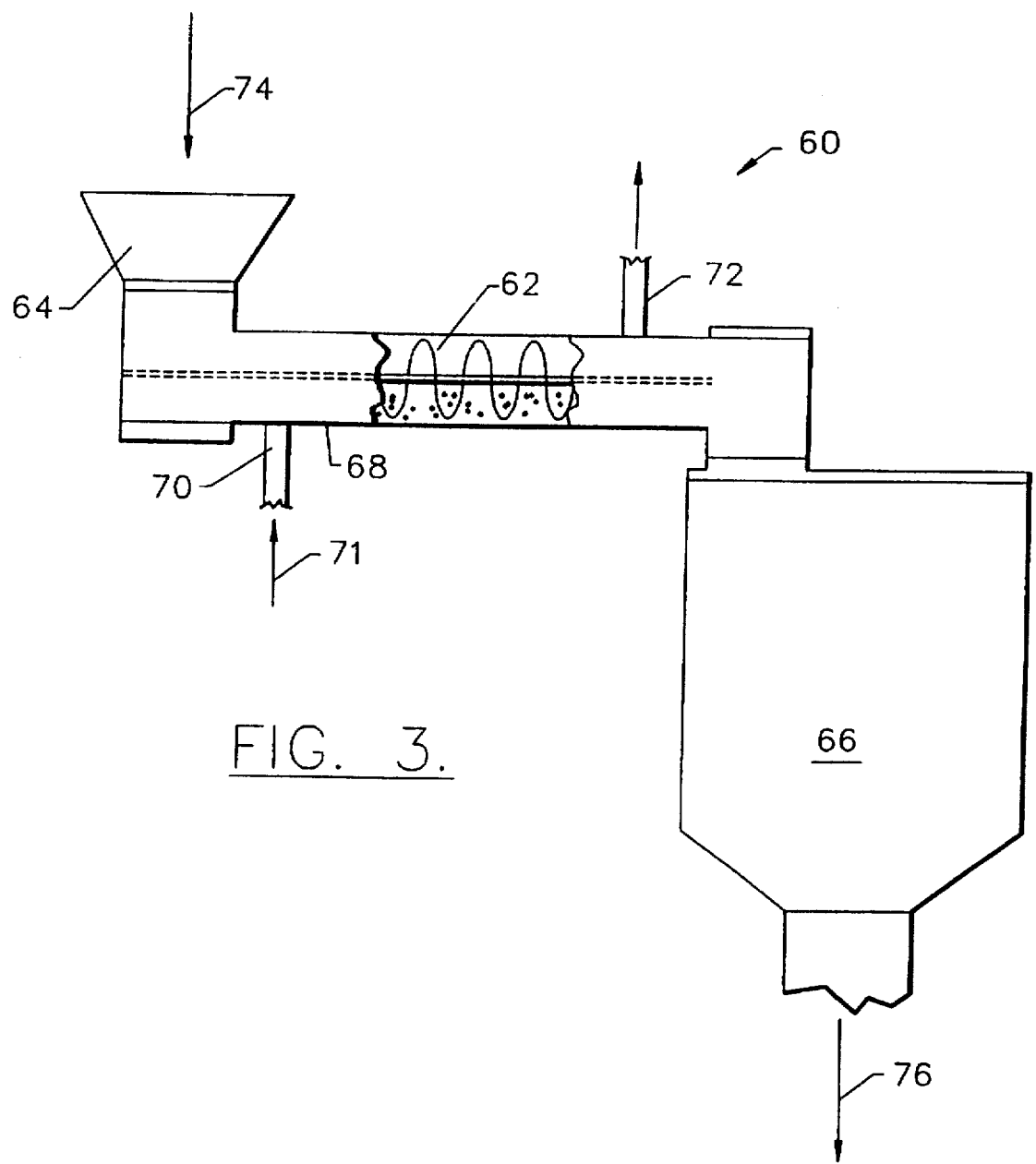
FIG. 3 is a partial schematic diagram illustrating an apparatus for exposing brown rice to ozone prior to the storage of the brown rice.

While it is anticipated that various combinations of apparatus elements typically used in the milling art will be incorporated, by way of example and with reference to FIG. 3, an exposure apparatus 60 in a preferred embodiment comprises a screw conveyor 62 having a first end communicating with a brown rice loading hopper 64 and a second end communicating with a brown rice storage hopper 66, wherein brown rice is conveyed from a loading hopper 64 through the screw conveyor 62 and into the storage hopper 66 for subsequent milling. The screw conveyor 62 operates within a conveyor housing 68. An ozone gas inlet 70 permits the ozone gas mixture 71 to flow within the conveyor housing 68 for exposing the brown rice 74 passing through the conveyor housing 68. A gas vent 72 communicates with the conveyor housing 68 for maintaining a fixed amount of ozone gas 71 within the conveyor housing 68. The screw conveyor 62 is operated at a constant speed for permitting brown rice 74 delivered to the loading hopper 64 to spend a predetermined amount of time within the conveyor housing 68 and thus be exposed to a fixed amount of ozone gas 71 during its travel from the conveyor hopper 64 through the screw conveyor 62 into the storage hopper 66. After being held in the storage hopper 66 for at least a day, the exposed brown rice is then ready for delivery 76 onto the well-known milling processes.

While a specific embodiment of the invention has been described in detail herein above, it is to be understood that various modifications may be made from the specific details described herein without departing from the spirit and scope of the invention as set forth in the appended claims.

Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. A method for pre-treating dehulled brown rice having a bran coat for producing head rice, the method comprising the steps of:

generating ozone gas;

providing dehulled brown rice having a bran coat thereon;

exposing the dehulled rice to an atmosphere of the generated ozone gas greater than that found in ambient air; and storing the ozone-exposed rice for a period of time such that the generated ozone gas interacts with the brown rice to effect loosening of the bran coat prior to milling the bran coat from the dehulled rice.

2. The method as recited in claim 1, wherein the rice exposing step comprises the steps of:

monitoring the exposure; and controlling the rice exposure for permitting the interaction of the ozone gas with the rice.

3. The method as recited in claim 1, wherein the storing step comprises the time period for storing the exposed rice for at least one day prior to milling.

4. The method as recited in claim 1, further comprising the step of providing a container and wherein the storing step further comprises the step of sealing the exposed rice within a container.

5. A method for protecting dehulled brown rice for enhancing head rice yield, the method comprising the steps of:

providing a container;

storing a quantity of brown rice in the container for exposing the rice contained therein to ozone;

injecting an atmosphere of generated ozone gas greater than found in ambient air into the container for exposing a substantial portion of the brown rice to the atmosphere of ozone gas; and storing the exposed brown rice for a period of time sufficient to effect a loosening of the bran coat for enhancing head rice yield resulting from milling the exposed brown rice when compared to the same milling of dehulled rice not exposed to the generated ozone gas.

6. The method as recited in claim 5, further comprising the step of milling the exposed rice after the exposed rice storing step wherein sufficient pressure is placed on the rice to mechanically remove the bran.

7. The method as recited in claim 5, wherein the ozone gas injecting step comprises the step of injecting the ozone gas at a container portion for permitting the ozone gas to diffuse through the rice contained therein.

8. The method as recited in claim 5, further comprising the steps of:

generating the ozone gas for injection into the container;

monitoring the quantity of ozone injected into the container;

controlling the ozone gas injecting step for providing an amount of ozone gas sufficient for loosening the bran to be removed from the brown rice.

9. The method as recited in claim 8, wherein the controlling step comprises the steps of:

directing ozone gas flow through a flow meter for providing a constant gas flow;

directing the constant gas flow through a control valve; and controlling valve operation for permitting the constant flow through the valve for a preselected time period.

10. The method as recited in claim 8, wherein the controlling step comprises the steps of:

holding a predetermined quantity of ozone gas within a container; and conveying the brown rice through the container for a predetermined amount of time.

11. A method for milling, the method useful for enhancing head rice yield from milling, the method comprising the steps of:

generating an atmosphere having a concentration of ozone gas greater than that found in ambient air;

exposing brown rice having a bran layer to the atmosphere for providing an ozone exposure level sufficient for an ozone gas interaction with the bran layer to be removed in milling;

storing the exposed rice for a time prior to milling, the storing time sufficient for permitting any interaction between the ozone and the brownrice to affect loosening of the rice bran layer; and milling the exposed rice with a sufficient degree of milling for removing the covering layer, the exposing, storing, and the degree of milling of the exposed rice improving head rice yield when compared to the same milling of rice not exposed to the generated ozone gas.

12. The method as recited in claim 11, wherein the exposed rice storing step provides a delay between the rice exposing step and rice milling sufficient for reducing rice breakage when compared to breakage during the same milling of unexposed brown rice.

13. The method as recited in claim 11, further comprising the step of providing a generally closed container for exposing a substantial portion of the rice to the ozone gas, the container having an inlet for receiving the ozone gas atmosphere and an outlet for venting any ozone gas atmosphere not interacting with the brown rice.

14. The method as recited in claim 11, wherein the storing step comprises the step of maintaining the exposed rice at a constant temperature.

15. The method as recited in claim 11, wherein the storing step comprises the step of storing the exposed rice in a sealed contained.

16. The method as recited in claim 11, wherein the exposing step comprises the steps of:

delivering unexposed brown rice through an enclosed conveyor for the exposing of the rice to the ozone gas atmosphere;

maintaining a predetermined amount of ozone gas within the conveyor; and passing the rice through the conveyor for a predetermined time period.

17. A method for pre-treating dehulled grains which still retain their bran coats, the method comprising the sequential steps of:

generating ozone gas;

exposing dehulled grain having a bran coat thereon to an atmosphere containing a concentration of the ozone gas greater than that found in ambient air;

storing the ozone exposed grain for a period of time such that the ozone interacts with the exposed grain to effect loosening of the bran coat; and then milling the exposed grain to remove the bran coat from the exposed grain, wherein the amount of ozone gas, the exposure time of the exposed grain to the ozone gas, and the storage time of the exposed grain prior to milling all being in an amount sufficient to provide an increased yield of unbroken grain when compared to the same milling step employed on grain that has not been exposed to the concentration of ozone and that has not been stored for the time period after exposure and before milling to remove the bran coat.

18. The method as recited in claim 17, wherein the dehulled grain is brown rice.

19. The method as recited in claim 17, wherein the time period for the stored grain after exposure is at least one day.

20. A method for pretreating dehulled grains which still retain their bran coats, the method comprising the sequential steps of:

generating ozone gas;

exposing dehulled grain having a bran coat thereon to an atmosphere containing a concentration of the generated ozone gas greater than that found in ambient air; and storing the ozone exposed grain for a period of time such that the ozone interacts with the exposed grain to effect loosening of the bran coat, wherein the amount of ozone gas, the exposure time of the exposed grain to the ozone gas, and the storage time of the exposed grain prior to milling of the grain all being in an amount sufficient to provide an increased yield of unbroken grain when compared to the same milling employed on grain that has not been exposed to the concentration of ozone and that has not been stored for the time period after exposure and before milling to remove the bran coat.

21. The method as recited in claim 20, further comprising the step of milling the exposed grain for removing the bran coat from the exposed grain.

22. The method as recited in claim 21, wherein the grain comprises dehulled brown rice.

23. A method for pretreating dehulled grains which still retain their bran coats, the method comprising the sequential steps of:

exposing dehulled grain having a bran coat thereon to an atmosphere containing a concentration of ozone gas greater than that found in ambient air;

storing the ozone exposed grain for a period of time such that the ozone interacts with the exposed grain to effect loosening of the bran coat; and then milling the exposed grain to remove the bran coat from the exposed grain, wherein the amount of ozone gas, the exposure time of the exposed grain to the ozone gas, and the storage time of the exposed grain prior to milling all being in an amount sufficient to provide an increased yield of unbroken grain when compared to the same milling step employed on grain that has not been exposed to the concentration of ozone and that has not been stored for the time period after exposure and before milling to remove the bran coat.

24. The method as recited in claim 23, further comprising the step of generating the ozone gas for use in the exposing step.

25. The method as recited in claim 23, wherein the grain is rice.

26. A method for pretreating dehulled grains which still retain their bran coats, the method comprising the sequential steps of:

exposing dehulled grain having a bran coat thereon to an atmosphere containing a concentration of generated ozone gas greater than that found in ambient air; and storing the ozone exposed grain for a period of time such that the ozone interacts with the exposed grain to effect loosening of the bran coat for milling of the exposed grain to remove the bran coat from the exposed grain, wherein the amount of ozone gas, the exposure time of the exposed grain to the ozone gas, and the storage time of the exposed grain prior to milling all being in an amount sufficient to provide an increased yield of unbroken grain when compared to the same milling step employed on grain that has not been exposed to the concentration of ozone and that has not been stored for the time period after exposure and before milling to remove the bran coat.

27. The method as recited in claim 26, further comprising the step of generating the ozone gas for the exposing step.

28. The method according to claim 26, further comprising the step of milling the exposed grain for removing the bran coat from the exposed grain.

29. The method as recited in claim 26, wherein the dehulled grain is brown rice.

30. The method as recited in claim 26, wherein the time period for the storing step is at least one day.

* * * * *